Patented June 12, 1923.

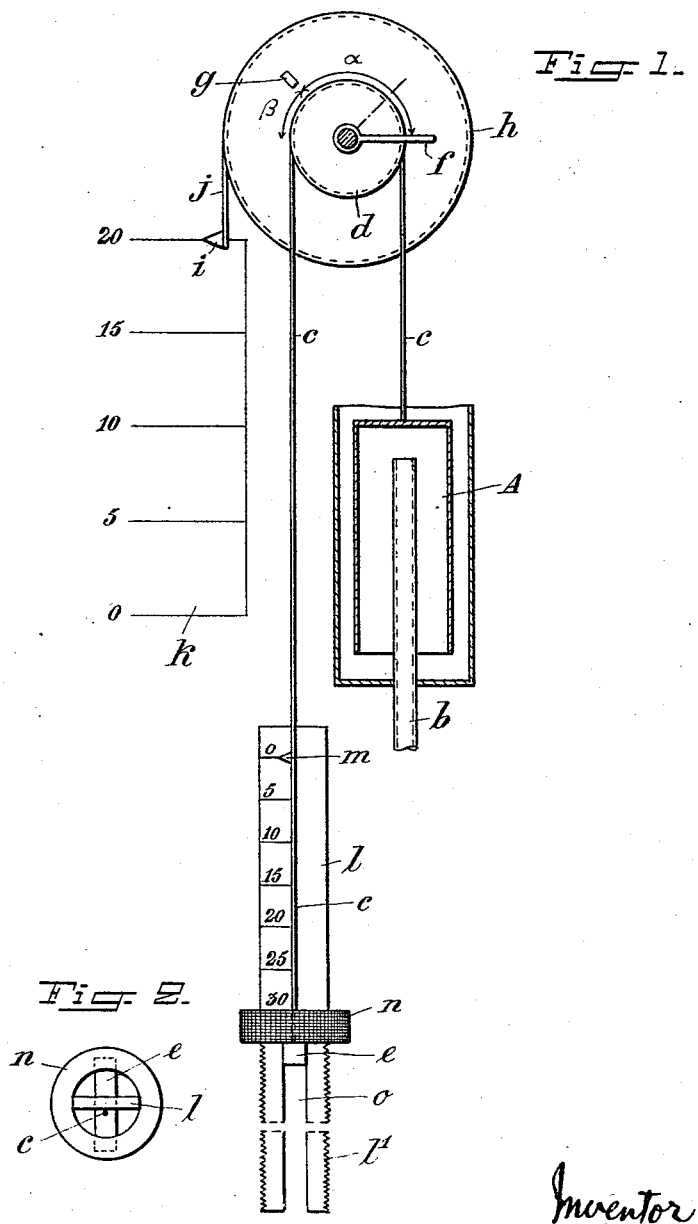

1,458,893

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN.

REGISTERING MECHANISM OF GAS-ANALYSIS APPARATUS.

Application filed October 31, 1918. Serial No. 260,548.

*To all whom it may concern:*

Be it known that I, OLOF RODHE, chief engineer, subject of the King of Sweden, residing at 54 Odengatan, Stockholm, Sweden, have invented certain new and useful Improvements in the Registering Mechanism of Gas-Analysis Apparatus, of which the following is a specification.

In known gas analysis apparatus the result, obtained in a second measuring-vessel, is generally registered by a mechanism, which indicates directly on a diagram or scale the percentage of the gas absorbed in per cent of the volume of the original gaseous mixture.

As gas analysis apparatus generally is built for determining the percentage of carbon dioxide in a gaseous mixture, such as combustion gases from furnaces and since the percentage of carbon dioxide theoretically cannot exceed 20% of the original gas volume, a diagram, provided with a scale from 0 to 20, has been used in the mechanism and the whole apparatus has further been constructed for a corresponding result in such a way, that an absorption in the absorbing vessel of 20% of the total gas volume is the most that can be indicated on the scale.

This results in a considerable inconvenience, in that the gas analysis apparatus can not be used for determining the percentage of a constituent of the gas, when the said percentage exceeds 20%. If the percentage of said constituent is, for instance, 30%, the mechanism will never be moved, as the condition of movement is, that at least 80% of the original gas volume shall remain after the absorption.

The object of this invention is to avoid said inconvenience, which is attained thereby, that any of the devices of the mechanism, or their movements, such as the measuring-bell, the diagram, the recording stylus or the transmission between the measuring-bell and the stylus is adjustable on a suitable scale in such a way, that even a quantity of gas larger than that one for which the apparatus is constructed, can be recorded.

On the accompanying drawing an embodiment of the present invention, arranged in connection with the mechanism of a gas analysis apparatus of known construction, is schematically shown in Fig. 1. Fig. 2 shows the scale $l$ and its parts from below.

In this embodiment an adjustment is effected of the position from which the measuring-bell starts to rise when the gaseous mixture begins to flow into it, it being understood that whatever the starting position of the measuring bell, its movement will be proportional to the quantity of gaseous mixture which flows into it. When the gaseous mixture has passed through the first measuring receptacle and the usual absorption vessel, it flows to the second measuring receptacle A through the pipe $b$. This apparatus can be built according to the U. S. A. Patent No. 1,063,091. The measuring-bell is supported by the chain $c$, running over the wheel or pulley $d$ and on its other end carrying a counterweight $e$ which is held down by the check-nut $n$. This nut $n$ can be screwed up and down on the scale $l$, which is attached to a suitable fixed support (not shown). Said scale is externally threaded on its lower end $l^1$ and has a slit $o$ for the weight $e$. The pulley $d$ is provided with the projection $f$, which, when the measuring-bell rises on account of the introduction of the gaseous mixture therein, will meet with the shoulder $g$ on a larger pulley $h$, which is movably arranged on the same shaft as the pulley $d$. Over the wheel $h$ runs a chain $j$, one end of which is fastened on the pulley, while the other end carries the crayon $i$, which on the diagram $k$ records the movement of the measuring-bell A. The crayon $i$ therefore first then will be put in action, when the projection $f$ meets with the shoulder $g$ and catches the larger pulley $h$ or in other words, the record discloses only the movement of the measuring-bell at the end of the filling, but this movement of the measuring-bell is geared in such a way, that the crayon $i$ will have a greater movement than the bell, in order to more clearly indicate the recording.

This apparatus is normally adjusted and the diagram $k$ provides for recording between zero and 20% of volume only; but by means of the auxiliary contrivances, which comprise my invention and which have been heretofore referred to, the apparatus may be adjusted to record an absorbed percentage amounting to more than 20% of the total gas volume. By screwing down the nut $n$ the weight $e$ will be lowered and the bell A, which is connected to the weight by chain $c$, will be raised to a predetermined new level, thus bringing the projection $f$ into the dotted position. The amount of elevation given to the bell A will be accurately indicated by the indicator $m$, secured to the chain $c$ and moving over the scale $l$.

Assuming for example that it is desired to ascertain the quantity of a constituent which amounts to between 20 and 30% of the total volume of the gaseous mixture. Without adjustment the apparatus will not record more than 20% of an absorbed constituent because the projection $f$, whose movement is proportional to the distance through which the unabsorbed gas will raise the bell A, will not reach and move the shoulder $g$ unless at least 80% of the total gas mixture enters the bell. But if the bell A is raised to a new starting level and the projection $f$ is at the same time advanced to a position nearer the shoulder $g$, it will require less than 80% of the total gas volume to cause the projection $f$ to traverse the shorter distance to the shoulder $g$ and thus move the indicator $i$. It should be understood that from any starting position of the bell A it will commence to rise as soon as the gas begins to flow into it.

As previously stated the bell is raised and the projection $f$ is given its new starting position by screwing down the nut $n$ on the threaded portion $l^1$ of the scale $l$. The scale $l$ is graduated in terms of the added recordable percentages of absorbed gas made possible by raising the bell A. In other words in the example taken, the nut $n$ will be screwed down carrying the weight $e$ before it and thus pulling down the chain $c$ until the indicator $m$ reaches the line 10 on the scale. It will be apparent that any percentage now indicated on the scale $k$ must be corrected by adding the 10% indicated on the scale $l$, the total percentage of absorbed gas being the sum of the percentages indicated on the two scales.

The movement of the projection $f$ exactly to the shoulder $g$ corresponds normally without adjustment exactly with 80% remainder of the original gas volume, which movement on the drawing is indicated with the curve $a$. If the movement is continued at the same time that the larger pulley $h$ becomes caught, there will be recorded on the diagram $k$, the curve $\beta$ corresponding to the remaining percentage beyond 80 of the original gas volume. If the measuring-bell is elevated to correspond to the line 10, the projection is removed to the dotted position. If thereafter the gaseous mixture, remaining from the absorption is introduced into the measuring bell, the recording mechanism starting from the adjusted position will be put in action in a known way. On the diagram $k$ thereby that part over 10% of the volume of the gaseous mixture will be indicated, which has been absorbed in the absorption vessel. If, for instance, the percentage of gas absorbed is 25%, the crayon $i$ would be moved to 15 on the diagram $k$, which, together with 10 on the scale $l$, corresponds to a percentage of 25%.

If it is desired to determine the voluminal percentage of gases which are present in the gaseous mixture and do not exceed 20% of the volume of the gaseous mixture, the indicator $m$ will be returned to 0 and the analysis will take place in the manner already known.

It is obvious, that the same result can be obtained through reversing the diagram $k$, the projection $f$, the shoulder $g$ or the vessel, which surrounds the measuring-bell A or through changing the length of the chains $c$ and $j$.

The diagram $k$ may be replaced by a scale and the crayon $i$ by an indicator.

In the appended claims, the expression "registering device" is intended to cover recording devices, as well as indicating devices, it being optional, so far as the present invention is concerned, whether or not a record of the gas analysis is made.

Claims:

1. In a gas-analyzing system, the combination of a gas analyzer, comprising a bell gasometer for measuring residual gas after absorption of a given constituent, registering means associated with a chart arranged to normally register on said chart when a predetermined minimum volume of unabsorbed gas is left after absorption of the absorbable portion of the gas mixture being tested, a lost motion connection between the bell of said gasometer and said registering means, with means for measurably diminishing by a predetermined amount the lost motion of the said lost motion connection.

2. In a gas-analyzing system, the combination of a gas analyzer including an element movable to different positions according to the volume of residual gas left after absorption of a constituent from a given initial volume of gas being treated, a registering device associated with a chart adapted to normally register only when a known minimum percentage of unabsorbable constituents are present in the gas being tested, a lost motion connection between said element movable to different positions and said registering device, and means for providing a predetermined known shortening of the amount of lost motion of said connection.

3. In a gas-analyzing system, the combination of a gas analyzer including an element movable to different positions according to the volume of unabsorbed gas, a registering device comprising a member movable with respect to an indicia-bearing gauge, a connection between said movable element of the analyzer and said movable member of the registering device, said connection having a lost motion, and means for regularly shortening the lost motion of said connection.

4. In a gas analyzing system, the combination of a gas analyzer including a bell gasometer for measuring residual gas after absorption of a given constituent, a transmitting member responsive to the movement of the bell of said gasometer, a second transmitting member actuated by the first transmitting member when the first transmitting member has moved a predetermined amount, a registering device including an indicator responsive to the second transmitting member, and means for varying the starting position of the first transmitting member.

5. In a gas analyzing system, the combination of a gas analyzer including a bell gasometer for measuring residual gas after absorption of a given constituent, a pulley, a chain or the like running on said pulley, said chain being secured at one end to the gasometer bell and having a counterweight secured to its other end, an indicator carried by said chain, a scale associated with said indicator, means for varying the starting elevation of the counterweight, a transmitting member actuated by the pulley when the pulley has rotated through a predetermined angle, and a registering device including an indicator responsive to said transmitting member.

6. A device according to claim 5, in which the transmitting member is a pulley mounted on the same axis as the first mentioned pulley and having an engaging element located in the path of a coacting engaging element on said first mentioned pulley.

In testimony whereof I affix my signature in presence of two witnesses.

OLOF RODHE.

Witnesses:
  JACOB BAGGE,
  CHARLES H. LAFELY.